United States Patent
Gubbi Lakshminarasimha et al.

(10) Patent No.: US 11,657,590 B2
(45) Date of Patent: May 23, 2023

(54) METHOD AND SYSTEM FOR VIDEO ANALYSIS

(71) Applicant: Tata Consultancy Services Limited, Mumbai (IN)

(72) Inventors: Jayavardhana Rama Gubbi Lakshminarasimha, Bangalore (IN); Akshaya Ramaswamy, Chennai (IN); Karthik Seemakurthy, Bangalore (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 333 days.

(21) Appl. No.: 17/187,929

(22) Filed: Mar. 1, 2021

(65) Prior Publication Data

US 2021/0390313 A1     Dec. 16, 2021

(30) Foreign Application Priority Data

Jun. 11, 2020   (IN) .............................. 202021024579

(51) Int. Cl.
*G06V 10/25* (2022.01)
*G06N 3/08* (2023.01)
(Continued)

(52) U.S. Cl.
CPC ............ *G06V 10/25* (2022.01); *G06F 18/214* (2023.01); *G06N 3/045* (2023.01); *G06N 3/08* (2013.01);
(Continued)

(58) Field of Classification Search
CPC ...... G06V 10/25; G06V 10/764; G06V 10/82; G06V 20/41; G06V 20/46; G06V 20/40; G06V 2201/03; G06F 18/214; G06F 18/22; G06N 3/045; G06N 3/08; G06N 3/084; G06N 3/02; G06N 3/044; G06N 3/04; G06N 3/048; G06T 2207/20084;
(Continued)

(56) References Cited

U.S. PATENT DOCUMENTS

| 8,730,396 B2 | 5/2014 | Kumaraswamy et al. |
| 10,706,286 B1* | 7/2020 | Muhamed ............ H04N 21/233 |
| 11,423,660 B2* | 8/2022 | Luk-Zilberman ........ G06N 3/08 |
| 2010/0049711 A1 | 2/2010 | Singh et al. |

(Continued)

*Primary Examiner* — Michael S Osinski
(74) *Attorney, Agent, or Firm* — Finnegan, Henderson, Farabow, Garrett & Dunner LLP

(57) ABSTRACT

State of the art techniques in the domain of video analysis have limitations in terms of capability to extract the spatial and temporal information. This limitation in turn affects interpretation of the video data. The disclosure herein generally relates to video analysis, and, more particularly, to a method and system for video analysis to extract spatio-temporal information from a video being analyzed. The system uses a neural network architecture which has multiple layers to extract spatial and temporal information from the video being analyzed. The method of training the neural network that extracts a micro-scale information from a latent representation of the video is presented. This is generated using an attention network, which is then used to extract spatio-temporal information corresponding to the collected video, which is then used in multiple video analysis applications such as searching actions in videos, action detection and localization.

19 Claims, 14 Drawing Sheets

(51) Int. Cl.
*G06V 20/40* (2022.01)
*G06F 18/214* (2023.01)
*G06N 3/045* (2023.01)
*G06V 10/764* (2022.01)
*G06V 10/82* (2022.01)

(52) U.S. Cl.
CPC ............ *G06V 10/764* (2022.01); *G06V 10/82* (2022.01); *G06V 20/41* (2022.01); *G06V 20/46* (2022.01)

(58) Field of Classification Search
CPC ............ G06T 2207/20081; G06T 7/11; G06T 2207/10081; G06T 7/0012; G06T 2200/04; G06T 2207/10016; G06T 2207/30196; G06T 7/33; G06T 7/62; A61B 5/7267; A61B 6/032; A61B 6/501; A61B 6/5217
See application file for complete search history.

(56) References Cited

U.S. PATENT DOCUMENTS

| | | | |
|---|---|---|---|
| 2017/0262995 A1* | 9/2017 | Li | G06N 3/044 |
| 2019/0332942 A1* | 10/2019 | Wang | G06F 17/13 |
| 2020/0082534 A1* | 3/2020 | Nikolov | G06T 7/0012 |
| 2021/0110532 A1* | 4/2021 | Braman | G06N 3/044 |
| 2021/0209731 A1* | 7/2021 | Li | G06T 3/4046 |
| 2021/0248749 A1* | 8/2021 | Novikov | G06N 3/08 |
| 2021/0248812 A1* | 8/2021 | Kuang | G06N 3/084 |
| 2021/0374950 A1* | 12/2021 | Gao | G06T 7/0012 |
| 2021/0401392 A1* | 12/2021 | Bengtsson | A61B 6/5217 |
| 2022/0012891 A1* | 1/2022 | Nikolov | G06T 7/11 |
| 2022/0019804 A1* | 1/2022 | Gubbi Lakshminarasimha .......... G06V 20/46 |
| 2022/0114424 A1* | 4/2022 | Quader | G06F 17/14 |
| 2022/0138913 A1* | 5/2022 | Huang | G06F 18/2134 348/241 |
| 2022/0299588 A1* | 9/2022 | Zhu | G01R 33/5611 |
| 2023/0024382 A1* | 1/2023 | Wang | G06F 18/22 |
| 2023/0074520 A1* | 3/2023 | Wei | G06T 11/008 |

* cited by examiner

METHOD AND SYSTEM FOR VIDEO ANALYSIS

PRIORITY CLAIM

This U.S. patent application claims priority under 35 U.S.C. § 119 to: India Application No. 202021024579, filed on Jun. 11, 2020. The entire contents of the aforementioned application are incorporated herein by reference.

TECHNICAL FIELD

This disclosure relates generally to video analysis, and more particularly to a method and system for video analysis to extract spatio-temporal information from a video being analyzed.

BACKGROUND

Video analysis is a process of analyzing video to extract information, and such information extracted via the video analysis may be further used in a variety of applications. Each video may have multiple subjects, and each subject may be performing different actions. While analyzing the video, a system performs object detection, localization, and identification of actions, so as to determine context of the video, and to extract one or more required details from the video. In another manifestation, the system takes a short video segment as input and searches similar actions in long videos sequences stored in a reference library.

The inventors here have recognized several technical problems with such conventional systems, as explained below. When quality of the video being analyzed is less, it is difficult to identify and differentiate between different subjects/objects, and to determine actions being performed by the subjects. Many systems exist that can perform image and video analysis to extract information. The systems that perform the video analysis require extraction of temporal as well as spatial information to effectively identify objects and to identify the actions. However, such existing systems have limitations in terms of capability to extract the spatial and temporal information. This in turn affects accuracy with which the information extraction is being carried out. Further, the state of the art systems try to interpret information from the videos only at a single time scale, which limits the amount of information interpreted and extracted, and in turn adversely affects quality of output.

SUMMARY

Embodiments of the present disclosure present technological improvements as solutions to one or more of the above-mentioned technical problems recognized by the inventors in conventional systems. For example, in one embodiment, a processor implemented method for video analysis is provided. In this method, a video is collected as input for analysis, via one or more hardware processors. The video is split to a plurality of frames of fixed length, via the one or more hardware processors. Further, temporal information is captured from each frame, by processing each frame using a three dimensional convolution unit among a plurality of three dimensional convolution units in a three dimensional convolution unit network, via the one or more hardware processors. Further, spatial information for each frame is captured by processing each frame using a 2-Dimensional (2D) convolution unit and a region proposal unit, via the one or more hardware processors. The temporal information and the spatial information are fed to a corresponding Long Short Term Memory (LSTM) block from among a plurality of LSTM blocks in a first LSTM layer, via the one or more hardware processors. The first LSTM layer generates a latent representation of the video as output, via the one or more hardware processors. Further, an attention network extracts micro-scale information comprising a plurality of hidden state representations and cell state representations of the video, from the latent representation of the video, via the one or more hardware processors. The micro-level information is fed as input to a second LSTM layer, via the one or more hardware processors. The second LSTM layer extracts a spatio-temporal information corresponding to the collected video, using the micro-level information from the attention network, via the one or more hardware processors. Further, the extracting spatio-temporal information is used to train a neural network, via the one or more hardware processors.

In another aspect, a system for video analysis is provided. The system includes one or more hardware processors, one or more communication interfaces, and a memory. The memory includes a plurality of instructions, which when executed, cause the one or more hardware processors to collect a video as input and perform the video analysis. Steps executed by the system, using the one or more hardware processors, during the video analysis are explained further. The video is split to a plurality of frames of fixed length, via the one or more hardware processors. Further, temporal information is captured from each frame, by processing each frame using a three dimensional convolution unit among a plurality of three dimensional convolution units in a three dimensional convolution unit network, via the one or more hardware processors. Further, spatial information for each frame is captured by processing each frame using a 2-Dimensional (2D) convolution unit and a region proposal unit, via the one or more hardware processors. The temporal information and the spatial information are fed to a corresponding LSTM block from among a plurality of LSTM blocks in a first LSTM layer, via the one or more hardware processors. The first LSTM layer generates a latent representation of the video as output, via the one or more hardware processors. Further, an attention network extracts micro-scale information comprising a plurality of hidden state representations and cell state representations of the video, from the latent representation of the video, via the one or more hardware processors. The micro-level information is fed as input to a second LSTM layer, via the one or more hardware processors. The second LSTM layer extracts a spatio-temporal information corresponding to the collected video, using the micro-level information from the attention network, via the one or more hardware processors. Further, the extracting spatio-temporal information is used to train a neural network, via the one or more hardware processors.

In yet another aspect, a neural network for extracting spatio-temporal information from a video input is provided. An input layer of the neural network includes a plurality of input blocks, and each of the plurality of input blocks collects one frame each, from among a plurality of frames of fixed length of the video input. A three dimensional convolution layer of the neural network includes a plurality of three dimensional convolution units, wherein the three dimensional convolution layer captures a temporal information from each frame of the video input. Further, a 2-Dimensional (2D) convolution unit and a region proposal unit of the neural network extract a spatial information from each frame of the video input. Further, a max layer which includes a plurality of max blocks flattens a four dimensional data at output of the 3D convolution layer to a three dimensional data, which is fed as input to the first LSTM layer. Further, a first LSTM layer which includes a plurality of LSTM blocks generates a latent representation of the video input by processing the extracted temporal information and the spatial information. Further, an attention network of the neural network, which includes a plurality of attention blocks, extracts a micro-scale information which includes a plurality of hidden state representations and cell state representations of the video input, from the latent representation of the video. Further, a second LSTM layer of the neural network, which includes a plurality of LSTM blocks, extracts spatio-temporal information corresponding to the collected video, using the micro-scale information from the attention network, and the neural network generates a data model using the spatio-temporal information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
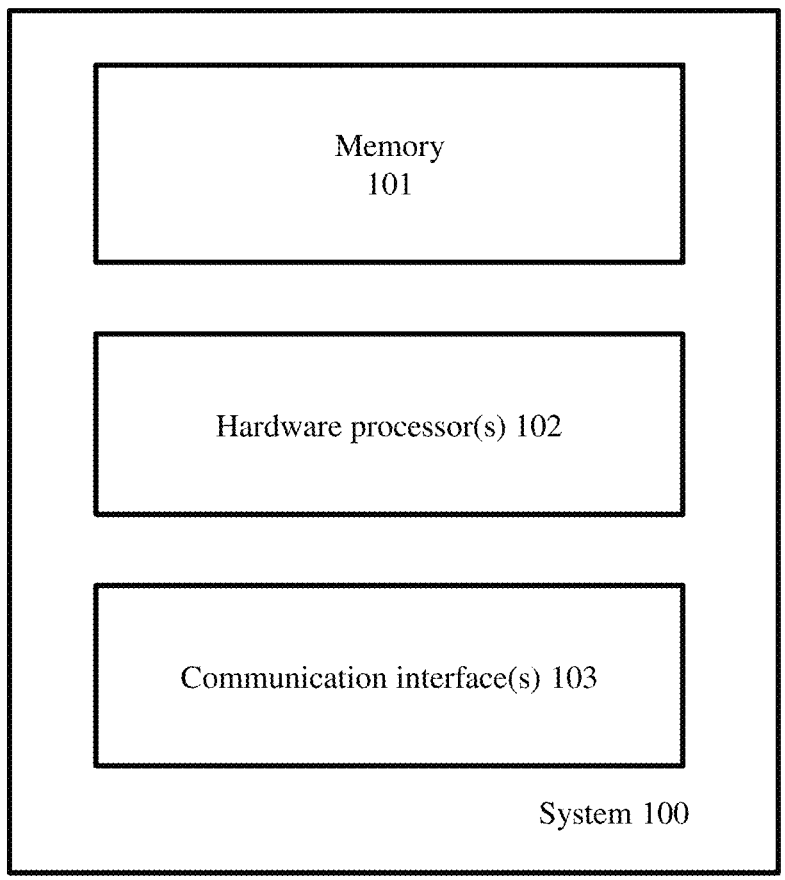
FIG. 1 illustrates an exemplary system for video analysis, according to some embodiments of the present disclosure.

FIG. 1 illustrates an exemplary system for video analysis, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like. The one or more hardware processors 102 can be implemented in the form of a neural network, wherein the neural network has multiple layers at which the video being analyzed is processed, and at different layers of the neural network, different types of information (such as spatial information, temporal information, macro-scale information, spatio-temporal information and so on) from the video are tapped, which together aid in data extraction from the video. Architecture of the neural network is depicted in FIG. 2.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the video analysis being performed by the system 100. The system 100 can be implemented in a variety of ways as per requirements. Various steps involved in the process of video analysis being performed by the system 100 are explained with description of FIGS. 6A-9. All the steps FIG. 6A to FIG. 9 are explained with reference to the system of FIG. 1 and the neural network architecture of FIG. 2.

Figure 2A:
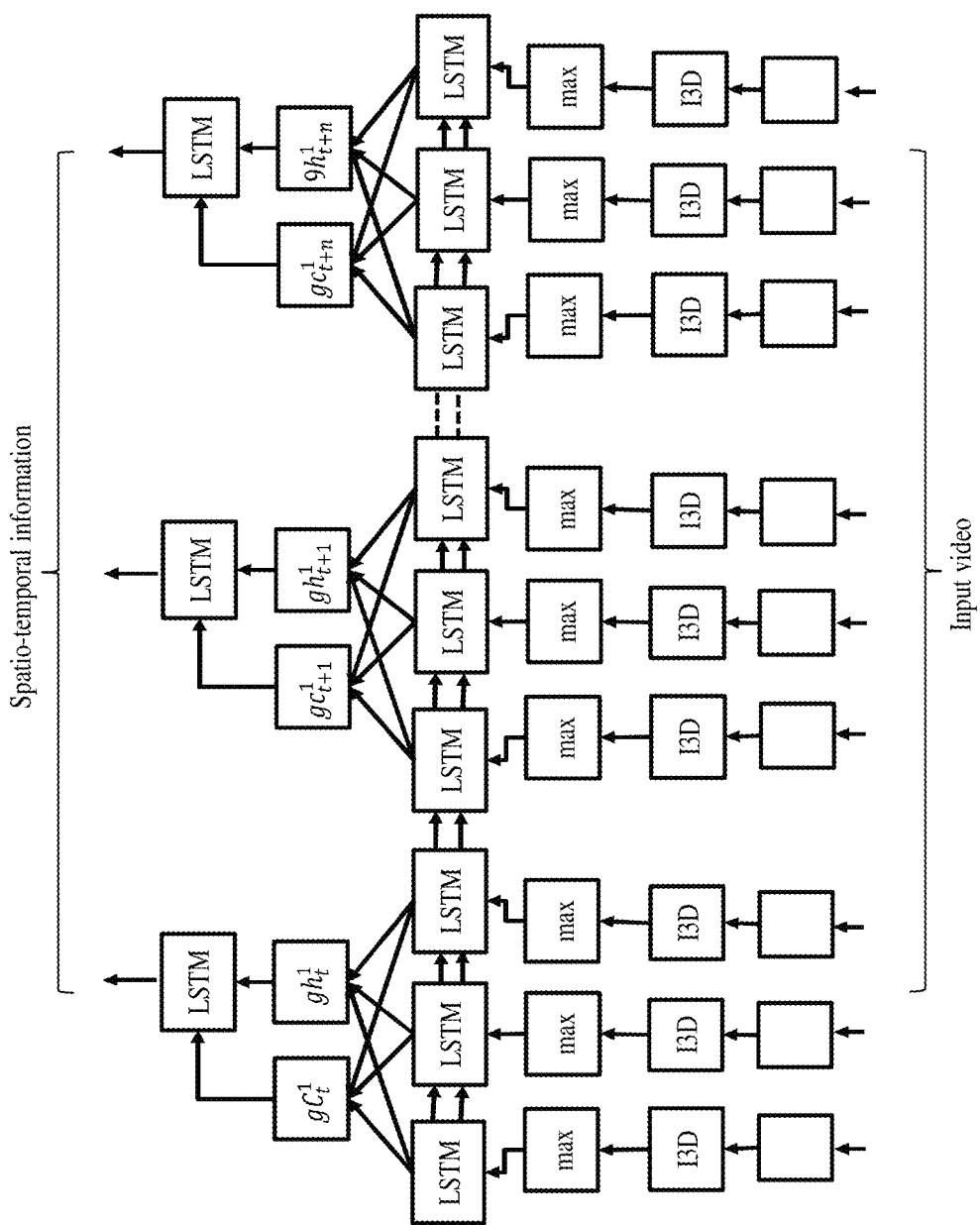
FIGS. 2A and 2B (collectively referred to as FIG. 2) are functional block diagrams depicting architecture of a neural network used by the system of FIG. 1, for the video analysis, according to some embodiments of the present disclosure.
Figure 2B:
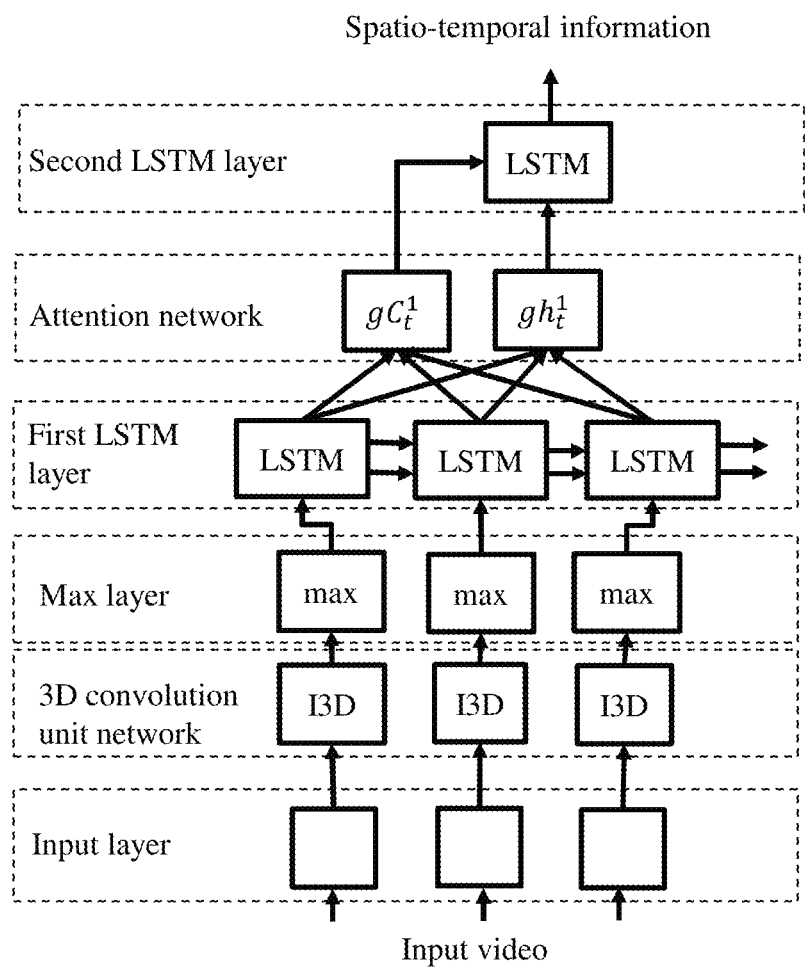

FIGS. 2A and 2B (collectively referred to as FIG. 2) are functional block diagrams depicting architecture of a neural network used by the system of FIG. 1, for the video analysis, according to some embodiments of the present disclosure. The neural network has a plurality of layers namely an input layer, a 3-Dimensional (3D) convolution layer, a max-pool layer, a first Long-Short Term Memory (LSTM) layer, an attention network, and a second LSTM layer. It is to be noted that similar to the way the first LSTM layer is combined with the second LSTM layer using the attention network, the second LSTM layer may be combined with a third LSTM layer and so on. This way the neural network, and in turn the system 100 can be scaled as per requirements. The neural network is configured to tap different information from an input vide being processed/analyzed, during the video analysis process. The blocks in the neural are depicted in FIG. 2A as well as in FIG. 2B, and the FIG. 2B specifically shows layer information i.e. information on different layers in the neural network. Data processing using the neural network is now explained with reference to the steps depicted in FIGS. 6A and 6B.

The system 100 collects (602) a video input, which is to be processed to perform the video analysis to extract information. The input video is split (604) to multiple frames of fixed length, and are processed by individual input blocks in the input layer, such that each input block processes one frame at a time. The input blocks may pre-process the frames to condition the frames for further processing. The pre-processed data (i.e. the frames) from each of the input blocks are fed as input to corresponding 3-Dimensional (3D) convolutional unit from among a plurality of 3D convolutional units in a 3D convolution unit network. Each of the 3D convolutional units processes the frame data and captures (608) temporal information from multiple continuous frames, wherein the number of continuous frames selected and processed together is pre-defined based on application. Simultaneously, the neural network also captures (606) spatial information, from each frame by processing each frame using a 2-Dimensional (2D) convolution unit and a region proposal unit. The 2D convolution unit and the region proposal unit are not shown in FIG. 1.

The captured temporal information and the spatial information are fed as inputs to the max-pool layer. The output of the 3D convolution unit network is a four dimensional data. This data needs to be flattened before feeding to the first LSTM layer. The max-pool layer applies a max pooling operation along a first dimension of the 4 dimensional data, and flattens the data to a three dimensional data. The three dimensional data is then fed as input to the first LSTM layer. The first LSTM layer includes a plurality of LSTM blocks/cells. Architecture of each of the LSTM blocks is depicted in FIG. 3.

Figure 3:
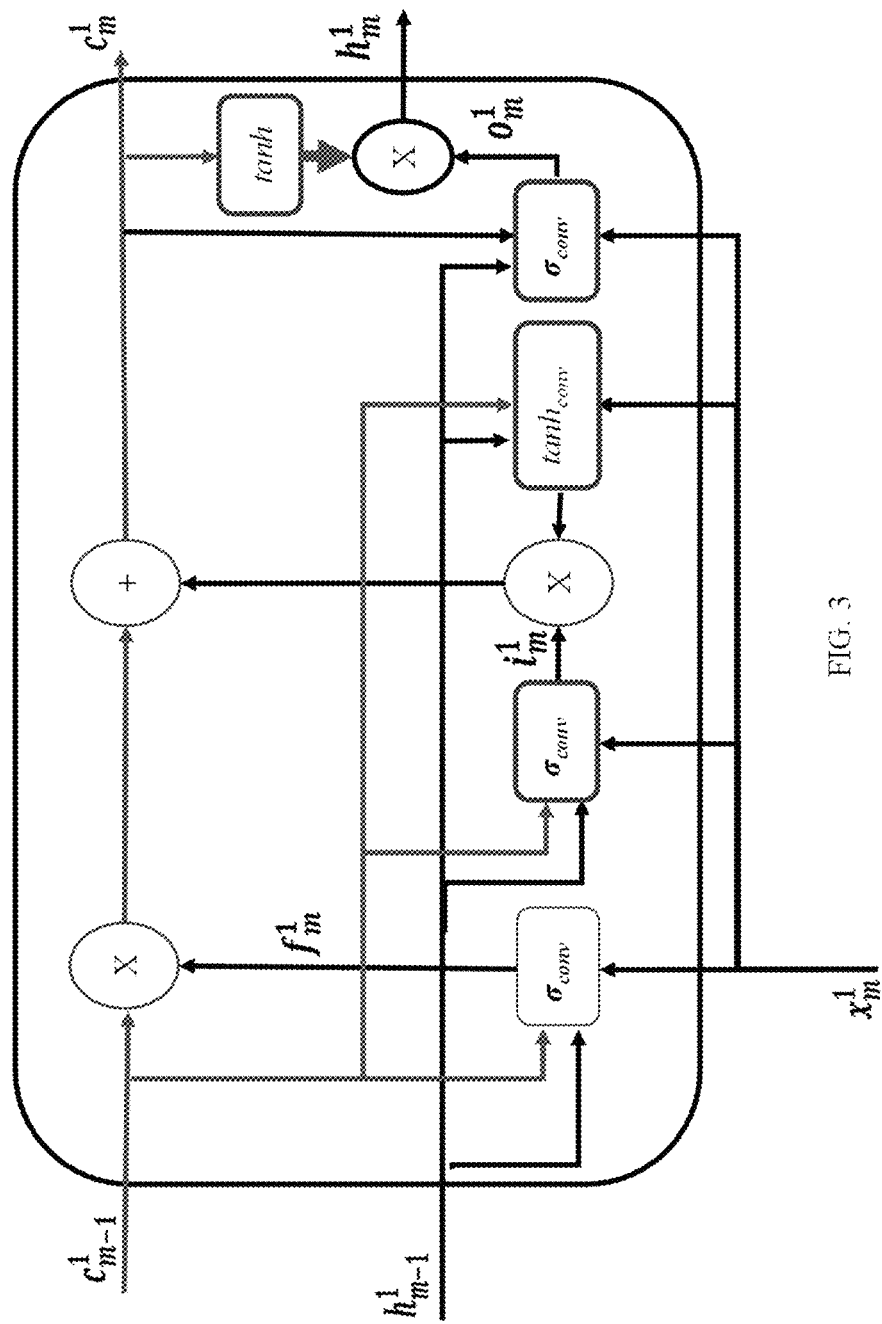
FIG. 3 illustrates architecture of a LSTM block in a first layer LSTM of the neural network of FIG. 2, in accordance with some embodiments of the present disclosure.

The architecture given in FIG. 3 is a Hierarchical Spatio Temporal (HST)-LSTM architecture. In an embodiment, one manifestation of the HST-LSTM architecture is explained using a set of equations as:

$$i_l^m = \sigma(W_{xi}^l * x_m^l + U_{hi}^l * h_{m-1}^l + U_{ci}^l \circ c_{m-1}^l + b_i^{ls}) \quad (1)$$

$$f_l^m = \sigma(W_{xf}^l * x_m^l + U_{hf}^l * h_{m-1}^l + U_{cf}^l \circ c_{m-1}^l + b_f^{ls}) \quad (2)$$

$$c_l^m = f_l^m \circ c_{m-1}^l + i_l^m \circ \tan h(W_{xc}^l * x_m^l + U_{hc}^l * h_{m-1}^l + b_l^c) \quad (3)$$

$$O_m^l = \sigma(W_{xo}^l * x_m^l + U_{ho}^l * h_{m-1}^l + U_{co}^l \circ c_m^l + b_o^l) \quad (4)$$

$$h_m^l = O_m^l \circ \tan h(c_m^l) \quad (5)$$

where * is the convolution operator, ∘ is the Hadamard product, subscript m indicates the time step, superscript l indicates a layer index, $x \in \mathbb{R}^d$ is the input vector to the LSTM unit which is extracted from I3D features, $f \in \mathbb{R}^h$ is the forget gate's activation, $i \in \mathbb{R}^h$ is the input gate's activation, $o \in \mathbb{R}^h$ is the output gate's activation, $c \in \mathbb{R}^h$ is the cell state vector, and $h \in \mathbb{R}^h$ is the hidden state vector. $W \in \mathbb{R}^{h+d}$, $U \in \mathbb{R}^{h+d}$, $b \in \mathbb{R}^h$ are the weight matrices and bias vectors which are learned during training. Dimensions of the input vector to LSTM and the hidden state vector are d and h, respectively.

It is to be noted that the number of LSTM blocks in the architecture can vary based on requirements (for example, amount of information to be processed, number of frames being processed at a time and so on), such that each of the LSTM blocks processes information corresponding to a fixed time period (for example, one second). Outputs of all the LSTM blocks are combined to generate (610) a latent representation of the video, which is output of the first LSTM layer. The latent representation of the video captures micro-actions from the video, wherein each micro-action spans for a duration of less than a second. Process executed by the first LSTM layer to generate the latent representation of the video includes the steps depicted in FIG. 7, and are explained below:

In order to generate the latent representation of the video, the first LSTM layer computes (702) an input gate mask $i_m^l$ by using the input video data $x_m^l$, latent feature representation of the video at a previous time step $h_{m-1}^l$, and cell state of a previous time step $c_{m-1}^l$. The first LSTM layer further computes (704) a forget gate mask $f_m^l$ by using the input video data $x_m^l$, the latent feature representation of $x_m^l$ at the previous time step $h_{m-1}^l$, and the cell state of previous time step $c_{m-1}^l$. The first LSTM layer further computes (706) the cell state at current time step $c_m^l$ by forwarding the input video data $x_m^l$ and representation from a previous time step through the input gate combined with the cell state from previous cell state as allowed by the forget gate. The system 100 then computes (708) an output gate mask $o_m^l$ using the input video data $x_m^l$, the latent representation at the previous time step $h_{m-1}^l$, and an updated cell state $c_m^{l'}$. Further, based on the cell state passed through the output gate, the system 100 generates (710) the latent representation $h_m^l$ (such latent representations generated at every successive LSTM layers are also referred to as 'new latent representation') for the input video data $x_m^l$.

Figure 4:
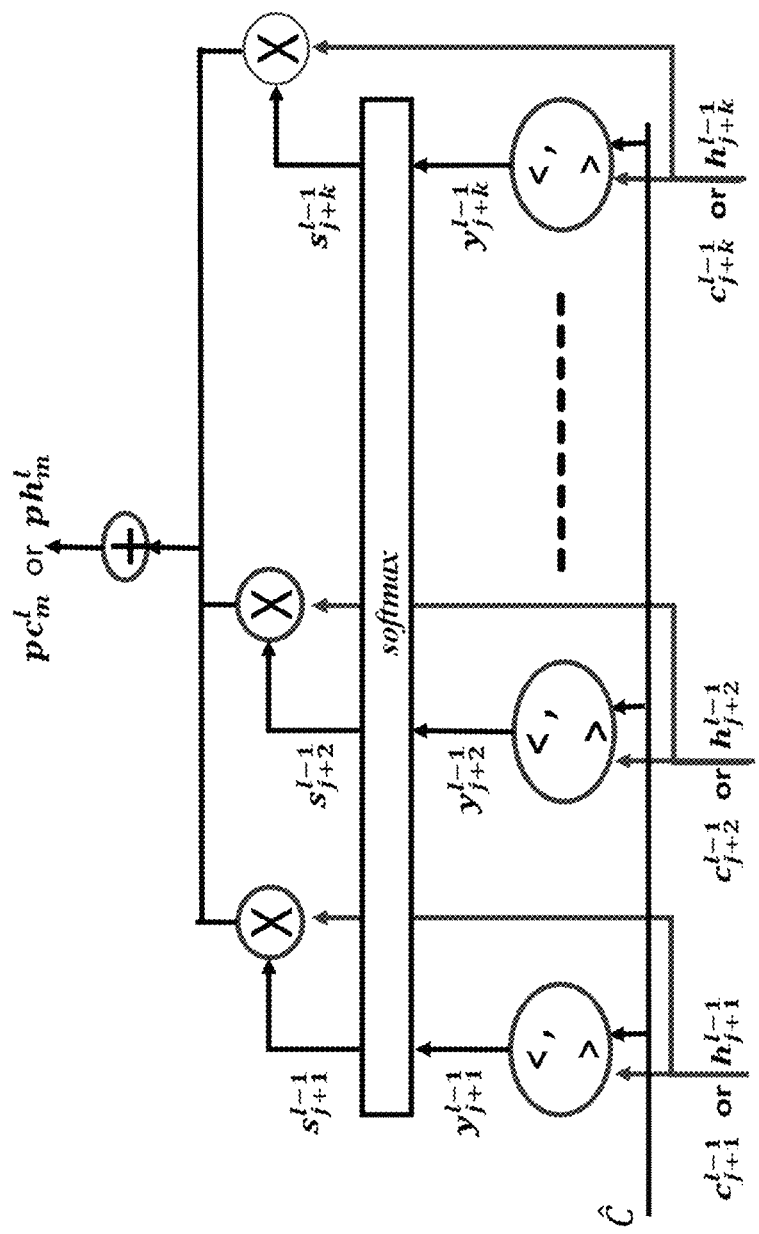
FIG. 4 illustrates architecture of an attention network of the neural network of FIG. 2, in accordance with some embodiments of the present disclosure.
Figure 5:
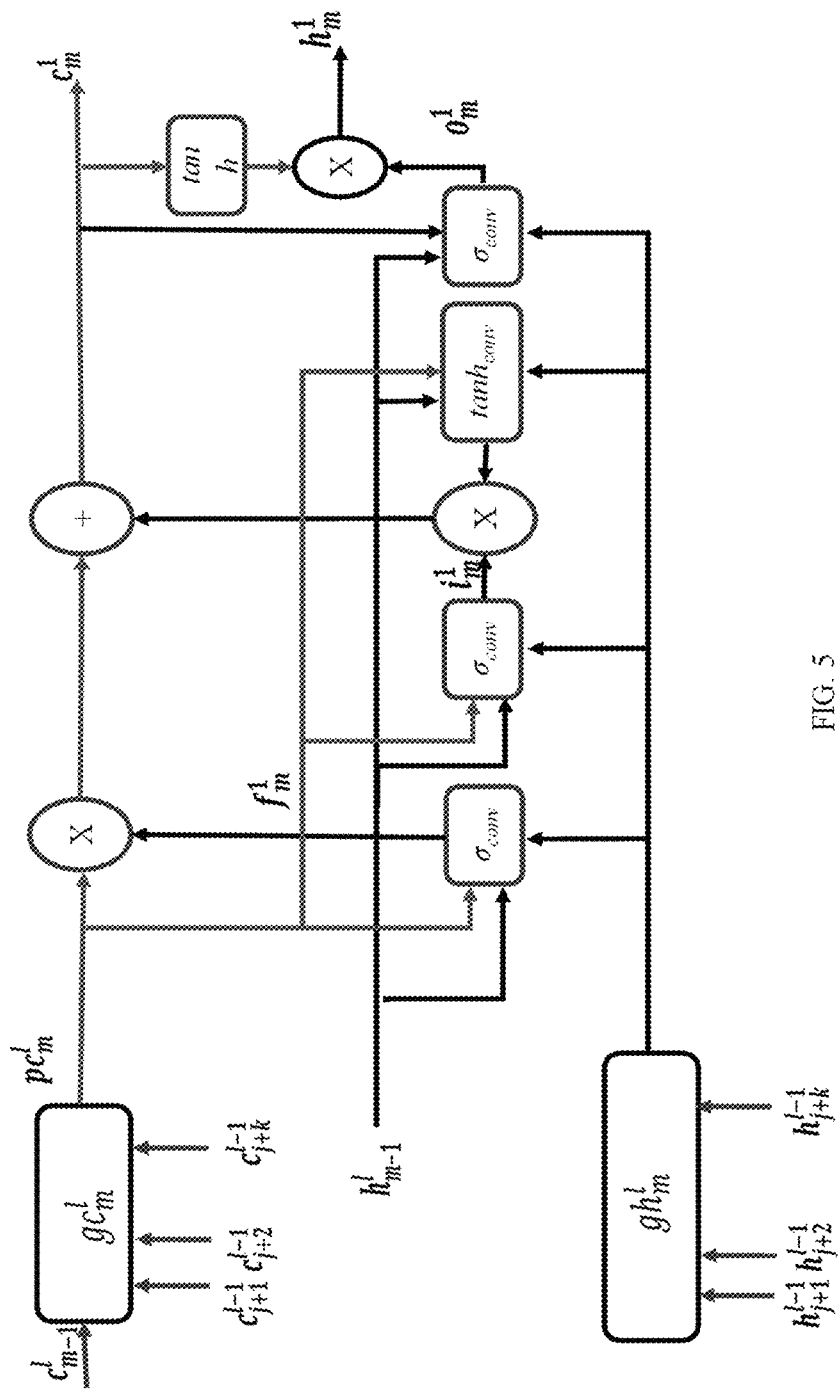
FIG. 5 illustrates architecture of a LSTM block in a second layer LSTM of the neural network of FIG. 2, in accordance with some embodiments of the present disclosure.
Figure 6A:
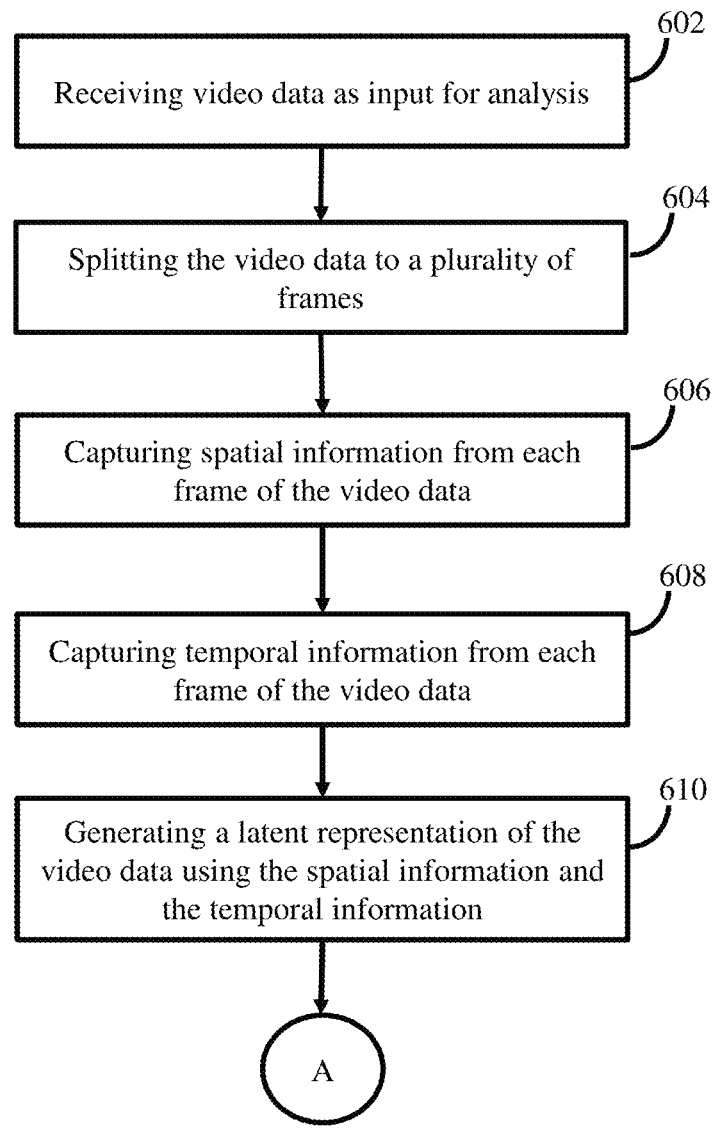
FIGS. 6A and 6B are flow diagrams depicting steps involved in the process of video analysis using the system of FIG. 1, in accordance with some embodiments of the present disclosure.
Figure 6B:
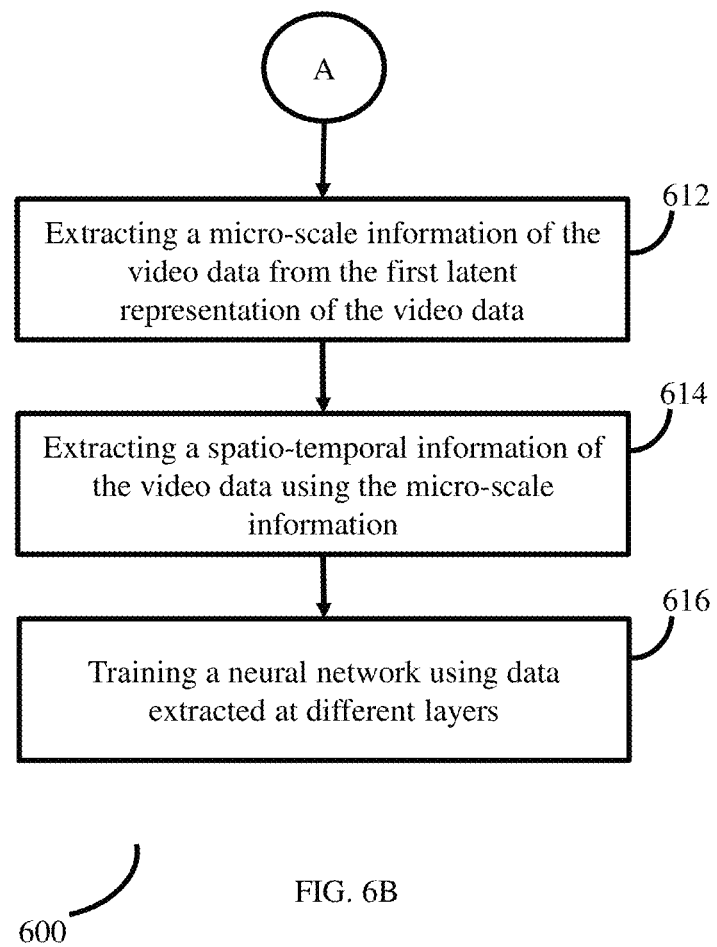
Figure 7:
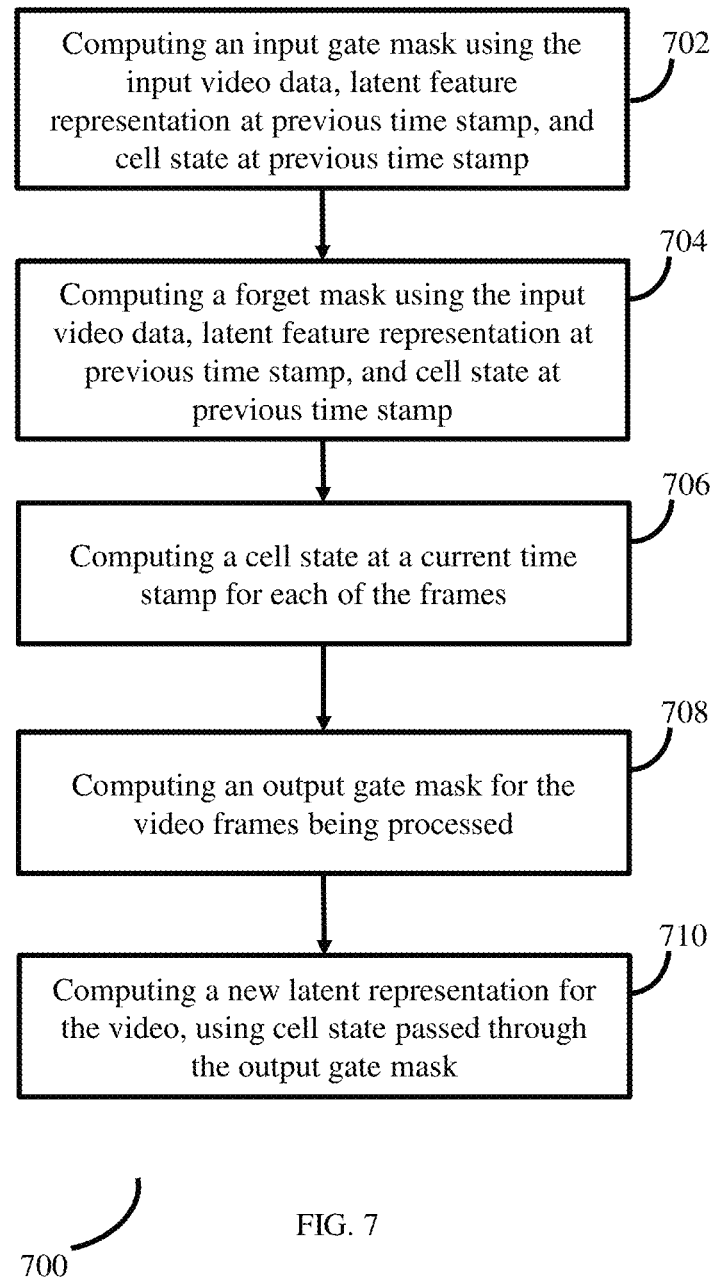
FIG. 7 is a flow diagram depicting steps involved in the process of computing a latent feature representation of the video, using the system of FIG. 1, in accordance with some embodiments of the present disclosure.
Figure 8:
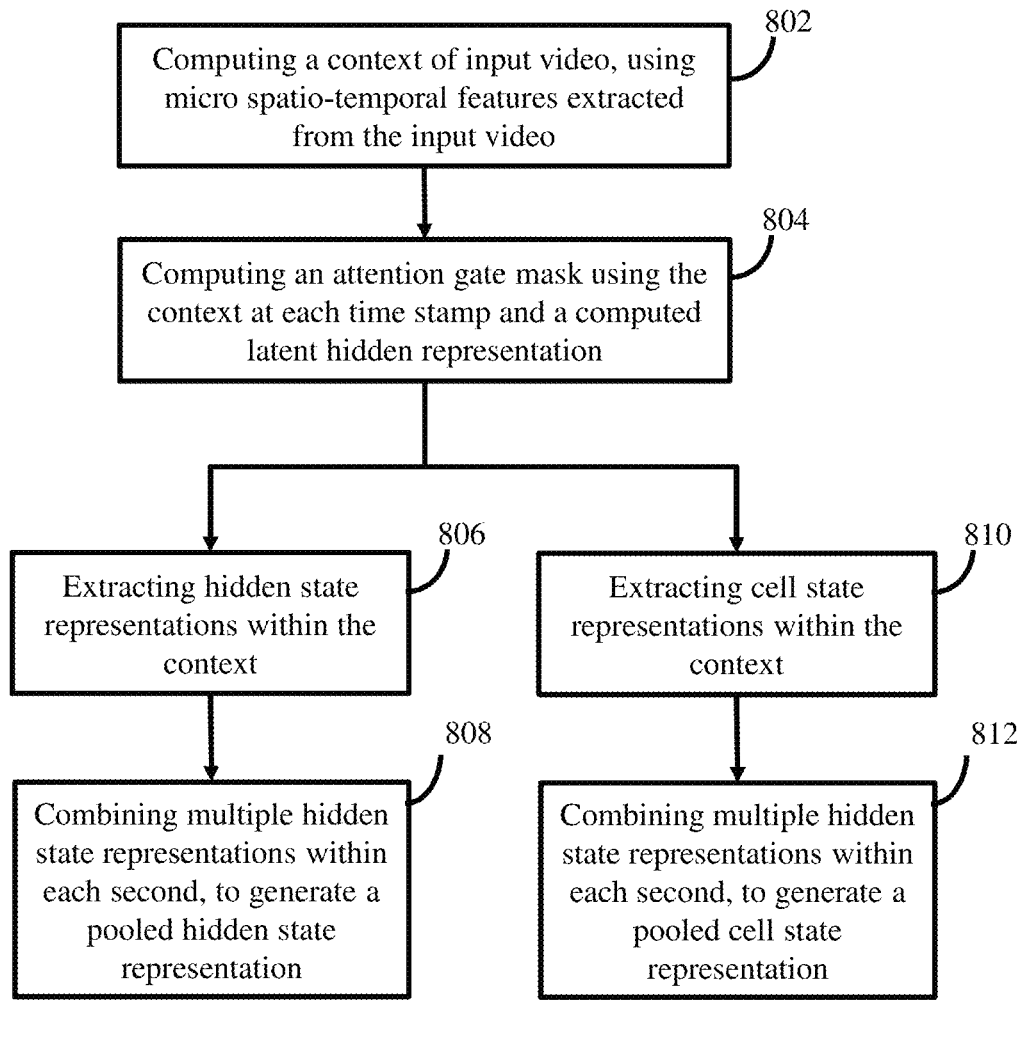
FIG. 8 is a flow diagram depicting steps involved in the process of extracting micro-scale information, using the system of FIG. 1, in accordance with some embodiments of the present disclosure.
Figure 9:
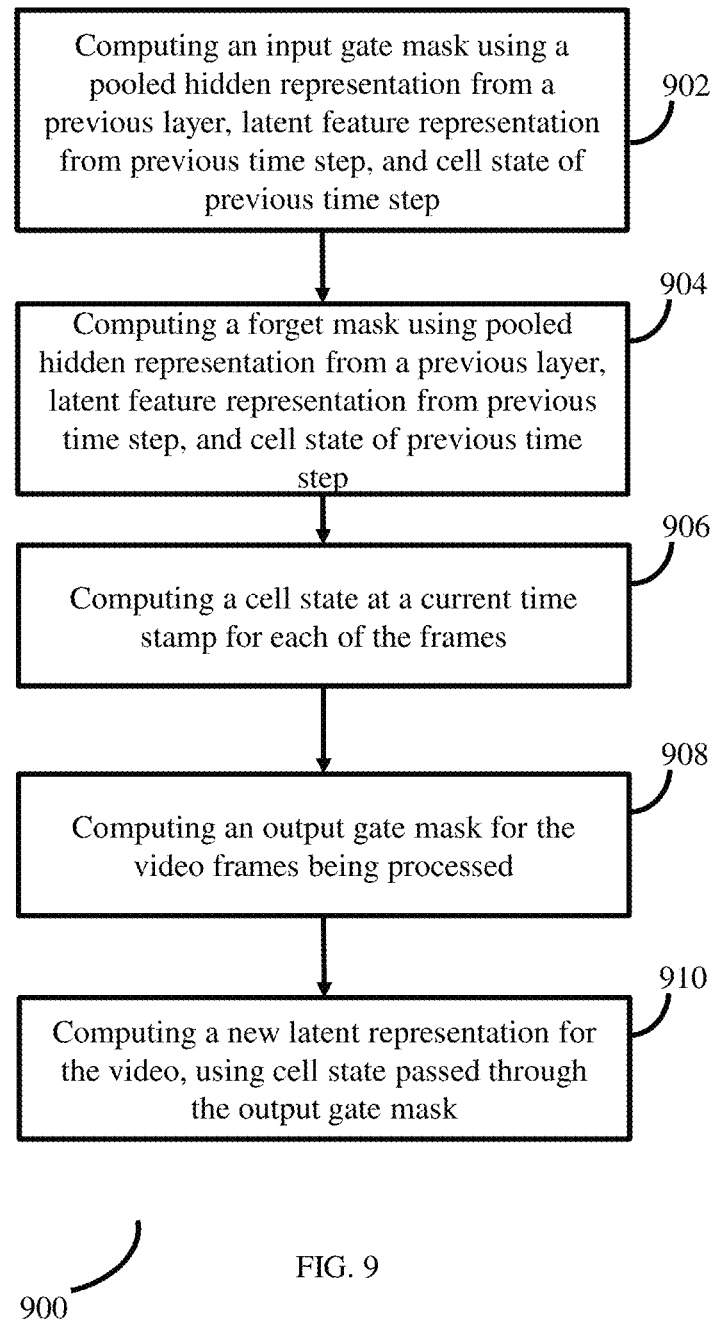
FIG. 9 is a flow diagram depicting steps involved in the process of extracting spatio-temporal information, using the system of FIG. 1, in accordance with some embodiments of the present disclosure.

The output of the first LSTM layer is fed as input to an attention network. The attention network includes a combination of attention pooling modules (also referred to as pooling modules) $gc_m^l$ and $gh_m^l$ to process the input data and to extract required information. Architecture of the pooling modules is depicted in FIG. 4. Inputs to $gc_m^l$ and $gh_m^l$ are cell states and hidden states respectively, which are extracted from the latent representation of the video. The attention network processes the collected inputs and extracts (612) micro-scale information, which comprise a plurality of hidden state representations $ph_m^l$ and cell state representations $pc_m^l$ of the video, from the latent representation of the video. Steps involved in the process of extracting the micro-scale information are depicted in FIG. 8, and are explained below:

The attention network performs an attention pooling of hidden states to generate a pooled hidden state representation ph, and an attention pooling of cell states to generate a pooled cell state representation pc. During the attention pooling of the hidden states, the attention network computes (802) a context $\hat{C}$ of the input video data $x_m^l$ by using micro spatio-temporal features extracted from the input video data $x_m^l$, and further computes (804) an attention gate mask $sh_{j+k}^{l-1}$ using the context $\hat{C}$ at each time step and a latent hidden representation computed from the first layer LSTM. The attention network further extracts (806) a plurality of hidden state representations within the context $\hat{C}$ by using an attention gate mask at every time step. Further, a plurality of the hidden state representations within each one second duration are combined (808) to generate the pooled hidden state representation ph. Similarly, while performing the attention pooling of cell states, the attention network extracts (810) cell state representations within the context $\hat{C}$ by using the attention gate mask at every time step, and further combines (812) a plurality of the cell state representations within one second duration to generate a pooled cell state representation pc. The extracted micro-scale information are fed as inputs to the second LSTM layer. Architecture of the second LSTM layer is depicted in FIG. 5. A set of equations manifesting the architecture of the second LSTM layer are given as:

$$yc_{m-1}^l = \langle \hat{C} \cdot c_{m-1}^l \rangle, \; yc_{j+n}^{l-1} = \langle \hat{C} \cdot c_{j+n}^{l-1} \rangle, \; yh_{j+n}^{l-1} = \langle \hat{C} \cdot h_{j+n}^{l-1} \rangle \tag{6}$$

$$sc_{m-1}^l = \frac{\exp(yc_{m-1}^l)}{\exp(yc_{m-1}^l) + \sum_{n=1}^{k} \exp(yc_{j+n}^{l-1})} \tag{7}$$

$$sc_{j+n}^{l-1} = \frac{\exp(yc_{j+n}^{l-1})}{\exp(yc_{m-1}^l) + \sum_{n=1}^{k} \exp(yc_{j+n}^{l-1})}, \; sh_{j+n}^{l-1} = \frac{\exp(yh_{j+n}^{l-1})}{\sum_{n=1}^{k} \exp(yh_{j+n}^{l-1})} \tag{8}$$

$$pc_m^l = sc_{m-1}^l \circ c_{m-1}^l + \sum_{n=(m-1)k+1}^{mk} sc_n^{l-1} \circ c_n^{l-1} \tag{9}$$

$$ph_m^l = \sum_{n=(m-1)k+1}^{mk} sh_n^{l-1} \circ h_n^{l-1} \tag{10}$$

$$i_m^l = \sigma(W_{xi}^l * ph_m^l + U_{hi}^l * h_{m-1}^l + U_{ci}^l \circ c_{m-1}^l + b_i^l) \tag{11}$$

$$f_m^l = \sigma(W_{xf}^l * ph_m^l + U_{hf}^l * h_{m-1}^l + U_{cf}^l \circ c_{m-1}^l + b_f^l) \tag{12}$$

$$c_m^l = f_m^l \circ pc_m^l + i_m^l \circ \tanh(W_{xc}^l * ph_m^l + U_{hc}^l * h_{m-1}^l + b_c^l) \tag{13}$$

$$O_m^l = \sigma(W_{xo}^l * ph_m^l + U_{ho}^l * h_{m-1}^l + U_{co}^l \circ c_{m-1}^l + b_o^l) \tag{14}$$

$$h_m^l = O_m^l \circ \tanh(c_m^l) \tag{15}$$

where, subscript n indicates the time step, $pc \in \mathbb{R}^h$ is the pooled cell state vector, and $ph \in \mathbb{R}^h$ is the pooled hidden state vector. yc, yh, sc, sh are the latent variables computed within the pooling function module. As depicted in the architecture, input to the LSTM cell in the first LSTM layer are modified I3D features, whereas the input to second LSTM layer is from the attention network which computes the hidden state vector by pooling k LSTM cells of previous layers and LSTM of previous time step. Different layers capture information from different time scales. The cell state at the second LSTM layer is function of cell states from the first LSTM layer. Likewise, for higher layers (which may be added by scaling up the architecture according to requirements), the cell state is function of cell states from previous LSTM layers. Hence, a representation computed at the final LSTM layer (i.e. second LSTM layer in the architecture in FIG. 2) gives a compact representation of the complete video segment, from which the spatio-temporal information is extracted by the final (second) LSTM layer. Steps involved in the process of extracting (614) the spatio-temporal information are depicted in FIG. 9, and are explained below:

The second LSTM layer computes (902) an input gate mask $i_m^l$ by using pooled hidden representation from previous layers $ph_m^l$, latent feature representation from previous time step $h_{m-1}^l$, and cell state of previous time step $c_{m-1}^l$. The second LSTM layer further computes (904) a forget gate mask $f_m^l$ by using pooled hidden representation from previous layers $ph_m^l$, the latent feature representation from previous time step $h_m^l$, and the cell state of previous time step $c_{m-1}^l$. The second LSTM layer then computes (906) a cell state at current time step by forwarding the pooled hidden state representation and representation from previous time step through the input gate combined with the pooled cell state as allowed by the forget gate, and then computes (908) the output gate mask $o_m^l$ using the pooled hidden representation, latent representation at previous time step, and an updated cell state. Further, a second latent representation $h_m^l$ for the given input video is computed (910) using the cell state passed through the output gate.

Data processing using the neural network is such that different types of information (such as temporal information, spatial information, micro-scale information, and the spatio-temporal information) are tapped at different layers of the neural network. This information can be then used for training (616) the neural network further, and output data generated by the neural network can be used to generate a data model, which can be used for video analysis and for extracting required information from a video being analyzed. The system 100 divides the spatio-temporal information into spatial information defined at a frame level. The system 100 further divides the spatio-temporal information into micro-temporal information comprising motion information spanning less than a second and macro-temporal information comprising information more than a second. The system 100 then generates a data model using the spatial information captured from the spatial information defined at the frame level, the micro-temporal information, and the macro-temporal information. The data model is updated using this approach, every time new information is processed by the system 100.

The information extracted from the video, and the data model generated, may be used for various applications. For example, the information can be used for Spatio-Temporal Action Detection and Localization (STADL). Consider that the input video on which the STADL is being performed has actions comprising micro actions spanning a second or less. As a result, the system 100 is required to perform spatial recognition of objects followed by micro-action recognition, which is then followed by action detection and identification. The system 100 processes the video using the approach described with description of FIG. 2, and extracts different information at different layers of the neural network. The extracted different types of information are then pooled using a ROI pooling technique. The system 100 detects objects in keyframes using pre-trained image classification network (such as ResNet-50) and region proposal network (such as Faster R-CNN). Spatio-temporal micro-action is picked from three dimensional convolution (I3D) stage of the network, and temporal information is represented by HST-LSTM features. The RoI pooling on these data ensures that same sized feature maps are generated by combining ResNet, I3D, and HST-LSTM for every second. The system 100 may perform a bounding box refinement on output of the RoI pooling, and further, various actions and micro-actions in the video are classified.

Experimental Results:

Two sets of experiments were conducted—Spatio-temporal re-localization (STRL) or video tubelet search, and Spatio-temporal action detection and localization (STADL).

During an experiment conducted for STADL, intersection-over-union (IoU) was computed at the frame level and at the video level. At the frame level, an IoU threshold was fixed as 0.5 and an average precision in line also was computed. Further, an average precision of each class was computed and a mean value over all the classes were taken to get a mean average precision (mAP). At the video-level, 3D IoUs were computed between ground truth tubes and linked detection tubes at the IoU thresholds of 0.05, 0.1, 0.2 and 0.3. Further, mAP was computed by averaging over all classes. In addition to the mAP score, top-1 accuracy value also was calculated. Top 'x' accuracy metric indicate percentage of correct action class detections among the top 'x' classes of the network detection. Each LSTM layer had 64 filters at every node. I3D output was passed through a convolution layer of 64 filters and this output formed the context to attention module modules in the attention network used. The loss function for UCF STADL was softmax cross-entropy and AVA STADL was sigmoid cross-entropy. The key frames in an AVA dataset were provided. For UCF dataset, middle frame was selected at every second as the keyframe. A stochastic gradient descent optimizer was used and the network was trained with an initial learning rate of 0.0001 on a Quadro K4200 GPU.

a. Experiments on the AVA Dataset

The AVA dataset (hereinafter referred to as 'dataset') was used for action recognition applications and video mining. In the AVA dataset used, 80 atomic actions which were densely annotated in 430 video clips, where each clip was of 15 minutes duration. There were multiple actors and multiple actions in any given frame. The dataset was split into 235 training, 64 validation, and 131 test videos. Further, videos from only 60 classes having at least 25 instances in the validation and test split were selected for further processing. Input to the STADL network was a set of 120 frames spanning 5 seconds. The frame size was retained as 320×400. During training, a training video was selected and it was randomly cropped as 5-second segments, and actions belonging to one of the 60 classes were evaluated. Since each action object can have multiple labels, the final action classification was done separately for each class using sigmoid layers and sigmoid cross-entropy loss; for regression, the L1 loss was minimized.

During the experiment, the neural network was trained to perform action detection and localization at 1 fps. The keyframe at each second was mapped to the object bounding box and action classification. The neural network was trained for 8000 iterations that took about 18 hours. The testing takes about 15 seconds. Table 1 shows frame-mAP with IoU of 0.5 as a metric for comparing the performance for AVA dataset. A single layer LSTM was used during the experiment. The system 100 outperformed state of the art systems when compared, with a frame-mAP of 31.4%. Difference between AVA v2.1 and v2.2 in Table. 1 was only in the annotations where 2.2 was more refined.

TABLE 1

| Approach | Frame mAP AVAv 2.1 | Frame mAP AVAv 2.2 |
|---|---|---|
| Approach 1 | 17.4 | — |
| Approach 2 | 18.6 | — |
| Approach 3 | 22.3 | — |
| Approach 4 | 23 | — |
| Approach 5 | 24.93 | — |
| Approach 6 | 27.2 | — |
| HST-LSTM | — | 31.4 | b. Experiments on the UCF Dataset

Figure 10A:
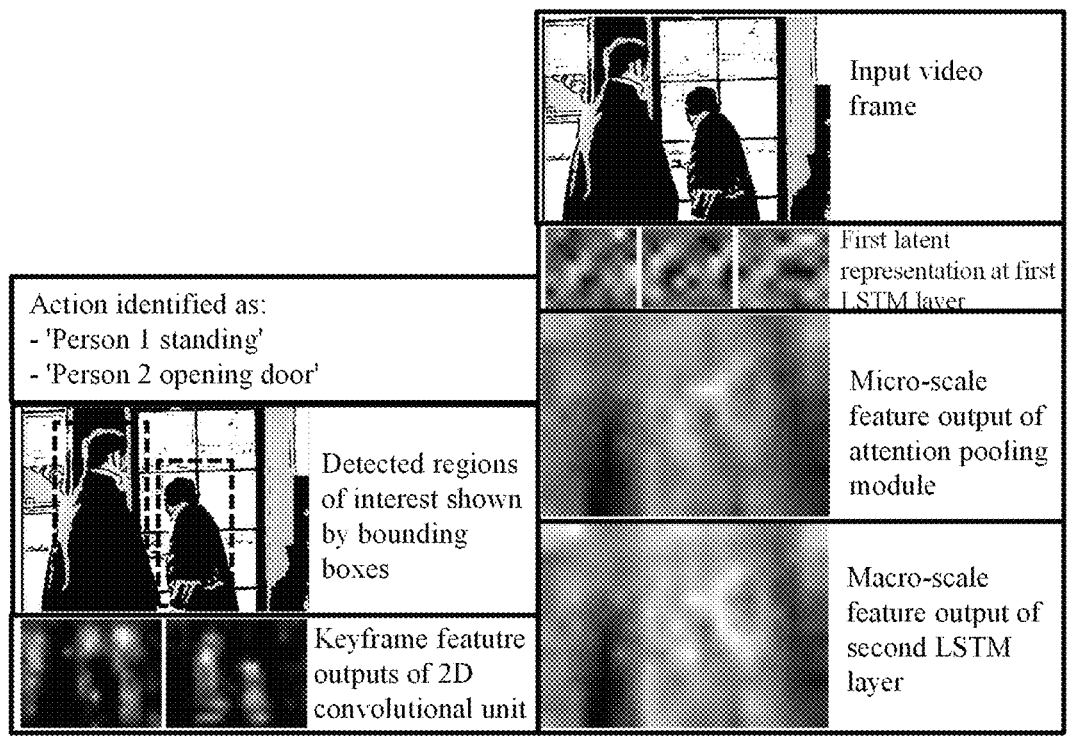
FIGS. 10A and 10B depict examples of Spatio-Temporal Action Detection and Localization (STADL) performed using the system of FIG. 1, in accordance with some embodiments of the present disclosure.
Figure 10B:
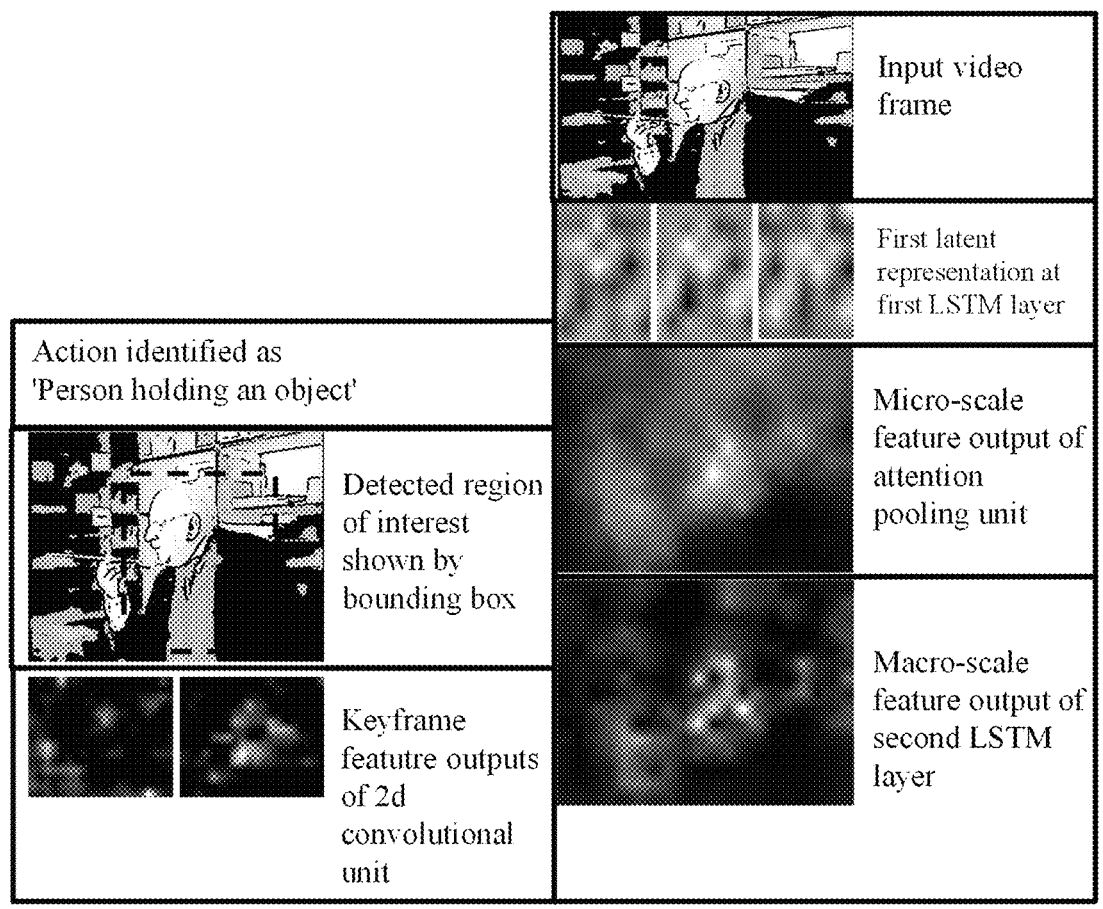

UCF101 is an action recognition dataset, consisting of 13320 training videos from 101 action classes. A subset of videos from 24 classes was annotated with person bounding boxes in one of the state of the art techniques. This 24-class dataset consists of 3207 training videos and is called UCF101D. A standard train-val split of three was used and the first split was selected. The input to the neural network was a video clip with a fixed duration of 5 seconds. The video frames were resampled at 24 frames per second, to get an input size of 120 frames for 5 seconds. The frame dimension was kept as 240×320. After resampling, twelfth frame at each second was fixed as the keyframe for training the Faster R-CNN and train the neural network for STADL for every second of the input. The annotation for this dataset was done at the video level, so each video is assigned an action class; the video action label is also used as the frame-level label during training of the neural network, for each second of the input five-second video segments. The neural network was trained for 18K iterations and the learning rate was halved after 10 k iterations. The testing time for a five-second video clip was observed to be about 12 seconds. Advancement of the video analysis being performed by the system 100 in comparison with various state of the art techniques is evident from the values in Table 2. Result of this experiment implies that the system 100 is able to extract better discriminative features than the state of the art techniques. Qualitative results are depicted in FIG. 10A and FIG. 10B. Rows indicate classes and columns indicate the center frames of first, third and fifth frames. Outputs for two actions; a first action in which one man is standing and other man is opening doors (scenario 1), and a second action in which a person holding an object (scenario 2) are depicted. In the scenario 1, bounding box encircling both the persons were detected. In the scenario 2, the system 100 was able to detect the person holding the object and put a bounding box around the person and the object. Overall, the frame-level detection improve considerably due to the capture of temporal variations across a longer time duration. The HST-LSTM approach was able to capture and propagate useful information even in the presence of large camera motion and varying environment.

TABLE 2

| | video mAP | | | | frame mAP | Top-1 |
|---|---|---|---|---|---|---|
| Approach | 0.05 | 0.1 | 0.2 | 0.3 | 0.5 | accuracy |
| Approach 1 | 84.6 | 83.1 | 76.6 | — | 75.0 | — |
| Approach 2 | 82.1 | 81.3 | 77.9 | 71.4 | — | — |
| Approach 3 | — | — | — | — | — | 97.6 |
| Approach 4 | — | — | — | — | — | 98.1 |
| Approach 5 | 88.3 | 87.1 | 82.2 | 71.4 | — | 98.2 |
| Approach 6 | 78.8 | 77.3 | 72.9 | 65.7 | — | — |
| HST-LSTM | 89.1 | 88.15 | 87.15 | 84.62 | 82.4 | 99 | c. Ablation Study

The ablation study was conducted to determine impact of features and number of layers, using an ablation experiment on the UCF101D data.

Feature Contribution:

The features from ResNet50, LSTM and I3D blocks were concatenated and were given as an input to a STADL classifier. Table 3 shows the influence of various features on the performance. Adding every feature boosted the performance of the proposed architecture reflecting their importance.

LSTM Layer Contribution:

Influence of LSTM layer in the neural network, as well as need for two or more layers of LSTM were assessed in this experiment. First row of Table 4 indicates the performance metrics when the features from the first layer LSTM are tapped while the second row indicates the performance when the features are tapped from second layer of LSTM. It can be seen that adding LSTM layers boosted the performance significantly. Attention pooling enables focusing an object of interest and reduces confusion between similar classes such as 'speaking to someone' and 'listening to someone/something'. Both action classes usually occur simultaneously, and are frequently mis-classified due to subtle spatio-temporal variations. During this experiment, attention pooling was compared with average pooling, and two observations were made: a) average pooling has very similar responses to classes that are almost identical in the spatial domain; b) Average pooling shows higher responses at spatial keypoints such as the bars on the door in the fourth output. In contrast, attention pooling is able to capture temporal variations accurately and gets activated in a region where the action happens, resulting in better performance.

During the experiment conducted for STRL, an input reference video $V_r$ of duration x seconds was considered. An input query video $V_q$ of duration y<x seconds also was considered. Aim of this experiment was to detect and localize z<x second video clip $V_{match}$ (not necessary that matching clip in reference video will have same duration as that of query clip) from the x second reference video clip—current network outputs matching probability at every second.

For the sake of STRL experiments, the input was expected to be a query video of length 5 seconds (with region of interest known) and reference video clip of length 5 seconds. The network (not shown) used by the system 100 outputs bounding boxes in the reference video and corresponding matching binary classification output at every second.

The network for STRL comprises of a twin network architecture for feature extraction like Siamese network. The feature extraction block comprises of HST-LSTM that gives three sets of features. This step is followed by a region proposal and region of interest pooling. Once the region of interest in reference video is detected, correlation between corresponding features is performed at every second to check whether there are areas of matching. The bounding box of the correlated areas in reference video are refined and finally classified as matching or non-matching (with query video). In this instance, HST-LSTM is used as a pre-trained network for features extraction for STRL application.

Figure 11:
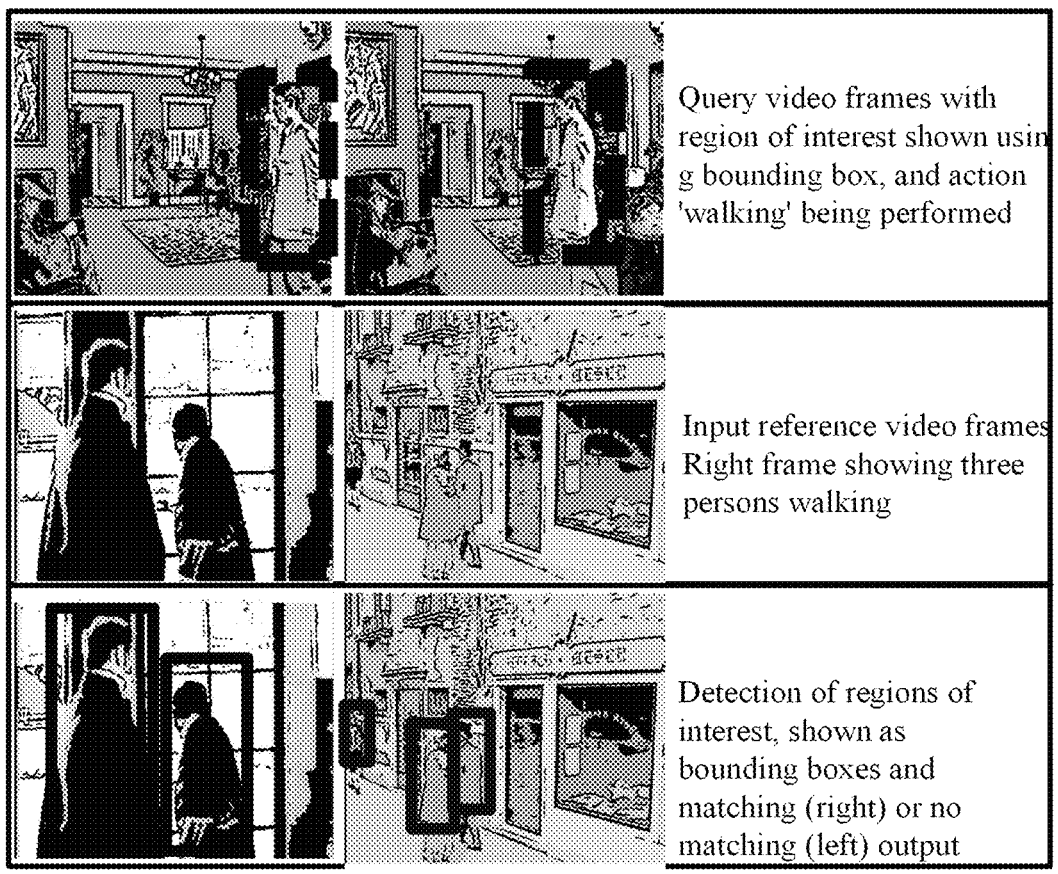
FIG. 11 depict examples of Spatio-temporal re-localization (STRL) performed using the system of FIG. 1, in accordance with some embodiments of the present disclosure.

For the STRL application, a subset of the AVA (Atomic Visual Action) dataset has been reorganized. Query videos of length in the range of 3 seconds to 5 seconds are generated from the AVA training set for two actions namely walking and closing door. This is depicted in FIG. 11. During network training, reference videos of length 10 seconds are randomly extracted from the training set. The network is trained to identify if the action in reference video matches the action in query video at every second. The trained network is evaluated on the AVA validation set for the same two actions. To evaluate the tubelet search performance, the accuracy, precision, recall and F-score of matching were computed. On the AVA validation set, an accuracy of 84.2%, precision 85%, recall 76.9% and F-score of 84.6% were achieved.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for video analysis, comprising:

receiving a video data as input for analysis, via one or more hardware processors;

splitting the video data to a plurality of frames of fixed length, via the one or more hardware processors;

capturing temporal information from a sequence of frames from the plurality of frames, by processing the sequence of frames using a three dimensional convolution unit among a plurality of three dimensional convolution units in a three dimensional convolution unit network, via the one or more hardware processors;

capturing spatial information for each frame by processing each frame using a 2-Dimensional (2D) convolution unit and a region proposal unit, via the one or more hardware processors;

feeding the temporal information and the spatial information to a corresponding Long Short Term Memory (LSTM) block from among a plurality of LSTM blocks in a first LSTM layer, via the one or more hardware processors;

generating a latent representation of the video as output, by the first LSTM layer, via the one or more hardware processors;

extracting micro-scale information comprising a plurality of hidden state representations and cell state representations of the video, from the latent representation of the video, using an attention network, via the one or more hardware processors;

feeding the micro-scale information as input to a second LSTM layer, via the one or more hardware processors;

extracting spatio-temporal information corresponding to the collected video, by processing the micro-scale information using the second LSTM layer, via the one or more hardware processors; and training a neural network using the extracted spatio-temporal information, via the one or more hardware processors.

2. The method as claimed in claim 1, wherein for each second of the video, a previous second LSTM state is fed as an initial cell state to each of the plurality of LSTM blocks.

3. The method as claimed in claim 1, wherein the first LSTM layer generates the latent representation of the video by:

computing an input gate mask $i_m^l$ by using the input video data $x_m^l$, a latent representation of the video at a previous time step $h_{m-1}^l$, and cell state of a previous time step $c_{m-1}^l$;

computing a forget gate mask $f_m^l$ by using the input video data $x_m^l$, the latent representation of $x_m^l$ at the previous time step $h_{m-1}^l$, and the cell state of previous time step $c_{m-1}^l$;

computing the cell state at current time step $c_m^l$ by forwarding the input video data $x_m^l$ and the latent representation of $x_m^l$ from the previous time step through the input gate combined with the cell state from previous cell state as allowed by the forget gate;

computing an output gate mask $o_m^l$ using the input video data $x_m^l$, the latent representation at the previous time step $h_{m-1}^l$, and an updated cell state $c_m^l$; and calculating a new latent representation $h_m^l$ for the input video data $x_m^l$ using the cell state passed through the output gate.

4. The method as claimed in claim 1, wherein the attention network extracts the micro-scale information by:

performing attention pooling of hidden states, comprising:

computing a context $\hat{C}$ of the input video data $x_m^l$ by using micro spatio-temporal features extracted from the input video data $x_m^l$;

computing an attention gate mask $sh_{j+k}^{l-1}$ using the context $\hat{C}$ at each time step and a latent hidden representation computed from the first layer LSTM;

extracting a plurality of hidden state representations within the context $\hat{C}$ by using an attention gate mask at every time step; and combining a plurality of the hidden state representations within each one second duration to generate a pooled hidden state representation ph; and performing attention pooling of cell states, comprising:

computing the context $\hat{C}$ of the input video data $x_m^l$ by using the micro spatio-temporal features extracted from the input video data $x_m^l$;

compute the attention gate mask $sc_{j+k}^{l-1}$ at every time step using the context $\hat{C}$ and the latent hidden representation computed from the first layer LSTM;

extracting cell state representations within the context $\hat{C}$ by using the attention gate mask at every time step; and combining a plurality of the cell state representations within one second duration to generate a pooled cell state representation pc.

5. The method as claimed in claim 1, wherein extracting the spatio-temporal information corresponding to the collected video, using the micro-scale information from the attention network, comprises:

computing an input gate mask $i_m^l$ by using a pooled hidden representation from previous layers $ph_m^l$, the latent representation from a previous time step $h_{m-1}^l$, and cell state of the previous time step $c_{m-1}^l$;

computing a forget gate mask $f_m^l$ by using the pooled hidden representation from previous layers $ph_m^l$, the latent feature representation from previous time step $h_m^l$, and the cell state of previous time step $c_{m-1}^l$;

computing a cell state at current time step by forwarding the pooled hidden state representation and representation from previous time step through the input gate combined with the pooled cell state as allowed by the forget gate;

computing the output gate mask $o_m^l$ using the pooled hidden representation, latent representation at previous time step, and an updated cell state; and computing a new latent representation $h_m^l$ for the given input video using the cell state passed through the output gate.

6. The method as claimed in claim 1, wherein training the neural network using the spatio-temporal information extracted from the collected video comprises:

dividing the spatio-temporal information into spatial information defined at a frame level;

dividing the spatio-temporal information into micro-temporal information comprising motion information spanning less than a second and macro-temporal information comprising information more than a second; and generating a data model using the spatial information captured from the spatial information defined at the frame level, the micro-temporal information, and the macro-temporal information.

7. A system for video analysis, comprising:

one or more hardware processors;

one or more communication interfaces; and a memory, wherein the memory comprises a plurality of instructions, which when executed, cause the one or more hardware processors to:

receive a video data as input for analysis;

split the video data to a plurality of frames of fixed length;

capture temporal information from a sequence of frames from the plurality of frames, by processing the sequence of frames using a three dimensional convolution unit among a plurality of three dimensional convolution units in a three dimensional convolution unit network;
capture spatial information for each frame by processing each frame using a 2-Dimensional (2D) convolution unit and a region proposal unit;
feed the temporal information and the spatial information to a corresponding LSTM block from among a plurality of LSTM blocks in a first LSTM layer;
generate a latent representation of the video as output, by the first LSTM layer;
extract micro-scale information comprising a plurality of hidden state representations and cell state representations of the video, from the latent representation of the video, using an attention network;
feed the micro-scale information as input to a second LSTM layer;
extract spatio-temporal information corresponding to the collected video, by processing the micro-scale information using the second LSTM layer, via the one or more hardware processors; and
train a neural network using the extracted spatio-temporal information.

8. The system as claimed in claim 7, wherein for each second of the video, a previous second LSTM state is fed as an initial cell state to each of the plurality of LSTM blocks.

9. The system as claimed in claim 7, wherein the first LSTM layer generates the latent representation of the video by:
compute an input gate mask $i_m^l$ by using the input video data $x_m^l$, a latent representation of the video at a previous time step $h_{m-1}^l$, and cell state of a previous time step $c_{m-1}^l$;
compute a forget gate mask $f_m^l$ by using the input video data $x_m^l$, the latent representation of $x_m^l$ at the previous time step $h_{m-1}^l$, and the cell state of previous time step $c_{m-1}^l$;
compute the cell state at current time step $c_m^l$ by forwarding the input video data $x_m^l$ and the latent representation of $x_m^l$ from the previous time step through the input gate combined with the cell state from previous cell state as allowed by the forget gate;
compute an output gate mask $o_m^l$ using the input video data $x_m^l$, the latent representation at the previous time step $h_{m-1}^l$, and an updated cell state $c_m^l$; and
calculate a new latent representation $h_m^l$ for the input video data $x_m^l$ using the cell state passed through the output gate.

10. The system as claimed in claim 7, wherein attention network extracts the micro-scale information by:
performing attention pooling of hidden states, comprising:
computing a context $\hat{C}$ of the input video data $x_m^l$ by using micro spatio-temporal features extracted from the input video data $x_m^l$;
computing an attention gate mask $sh_{j+k}^{l-1}$ using the context $\hat{C}$ at each time step and a latent hidden representation computed from the first layer LSTM;
extracting a plurality of hidden state representations within the context $\hat{C}$ by using an attention gate mask at every time step; and
combining a plurality of the hidden state representations within each one second duration to generate a pooled hidden state representation ph; and performing attention pooling of cell states, comprising:
computing the context $\hat{C}$ of the input video data $x_m^l$ by using the micro spatio-temporal features extracted from the input video data $x_m^l$;
compute the attention gate mask $sc_{j+k}^{l-1}$ at every time step using the context $\hat{C}$ and the latent hidden representation computed from the first layer LSTM;
extracting cell state representations within the context $\hat{C}$ by using the attention gate mask at every time step; and
combining a plurality of the cell state representations within one second duration to generate a pooled cell state representation pc.

11. The system as claimed in claim 7, wherein the system extracts the spatio-temporal information corresponding to the collected video, using the micro-scale information from the attention network, by:
computing an input gate mask $i_m^l$ by using a pooled hidden representation from previous layers $ph_m^l$, the latent representation from a previous time step $h_{m-1}^l$, and cell state of the previous time step $c_{m-1}^l$;
computing a forget gate mask $f_m^l$ by using the pooled hidden representation from previous layers $ph_m^l$, the latent feature representation from previous time step $h_m^l$, and the cell state of previous time step $c_{m-1}^l$;
computing a cell state at current time step by forwarding the pooled hidden state representation and representation from previous time step through the input gate combined with the pooled cell state as allowed by the forget gate;
computing the output gate mask $o_m^l$ using the pooled hidden representation, latent representation at previous time step, and an updated cell state; and
computing a new latent representation $h_m^l$ for the given input video using the cell state passed through the output gate.

12. The system as claimed in claim 7, wherein the system trains the neural network using the spatio-temporal information extracted from the collected video by:
dividing the spatio-temporal information into spatial information defined at a frame level;
dividing the spatio-temporal information into micro-temporal information comprising motion information spanning less than a second and macro-temporal information comprising information more than a second;
capturing spatial information from the spatial information defined at the frame level, and the micro-temporal information using the pre-trained deep convolutional neural network; and
generating a data model using the spatial information captured from the spatial information defined at the frame level, and the micro-temporal information.

13. A neural network for extracting spatio-temporal information from a video input, comprising:
an input layer comprising a plurality of input blocks, wherein each of the plurality of input blocks collects one frame each, from among a plurality of frames of fixed length of the video input;
a three dimensional (3D) convolution layer comprising a plurality of three dimensional convolution units, wherein the three dimensional convolution layer captures a temporal information from each frame of the video input;
a 2-Dimensional (2D) convolution unit and a region proposal unit, wherein the 2D convolution unit and the region proposal unit extracts a spatial information from a sequence of frames of the video input;

a max layer comprising a plurality of max blocks, wherein the max layer flattens a four dimensional data at output of the 3D convolution layer to a three dimensional data;

a first LSTM layer comprising a plurality of LSTM blocks, wherein the first LSTM layer generates a latent representation of the video input by processing the extracted temporal information and the spatial information;

an attention network comprising a plurality of attention blocks, wherein the attention network extracts micro-scale information comprising a plurality of hidden state representations and cell state representations of the video input, from the latent representation of the video; and a second LSTM layer comprising a plurality of LSTM blocks, wherein the second LSTM layer extracts spatio-temporal information corresponding to the collected video, using the micro-scale information from the attention network, wherein the neural network generates a data model using the spatio-temporal information.

14. A non-transitory computer readable medium, wherein the non-transitory computer readable medium comprising a plurality of instructions, which when executed, cause one or more hardware processors to:

receive a video data as input for analysis, via one or more hardware processors;

split the video data to a plurality of frames of fixed length, via the one or more hardware processors;

capture temporal information from a sequence of frames from the plurality of frames, by processing the sequence of frames using a three dimensional convolution unit among a plurality of three dimensional convolution units in a three dimensional convolution unit network, via the one or more hardware processors;

capture spatial information for each frame by processing each frame using a 2-Dimensional (2D) convolution unit and a region proposal unit, via the one or more hardware processors;

feed the temporal information and the spatial information to a corresponding Long Short Term Memory (LSTM) block from among a plurality of LSTM blocks in a first LSTM layer, via the one or more hardware processors;

generate a latent representation of the video as output, by the first LSTM layer, via the one or more hardware processors;

extract micro-scale information comprising a plurality of hidden state representations and cell state representations of the video, from the latent representation of the video, using an attention network, via the one or more hardware processors;

feed the micro-scale information as input to a second LSTM layer, via the one or more hardware processors;

extract spatio-temporal information corresponding to the collected video, by processing the micro-scale information using the second LSTM layer, via the one or more hardware processors; and train a neural network using the extracted spatio-temporal information, via the one or more hardware processors.

15. The non-transitory computer readable medium as claimed in claim 14, wherein for each second of the video, a previous second LSTM state is fed as an initial cell state to each of the plurality of LSTM blocks.

16. The non-transitory computer readable medium as claimed in claim 14, wherein the first LSTM layer generates the latent representation of the video by:

computing an input gate mask $i_m^l$ by using the input video data $x_m^l$, a latent representation of the video at a previous time step $h_{m-1}^l$, and cell state of a previous time step $c_{m-1}^l$;

computing a forget gate mask $f_m^l$ by using the input video data $x_m^l$, the latent representation of $x_m^l$ at the previous time step $h_{m-1}^l$, and the cell state of previous time step $c_{m-1}^l$;

computing the cell state at current time step $c_m^l$ by forwarding the input video data $x_m^l$ and the latent representation of $x_m^l$ from the previous time step through the input gate combined with the cell state from previous cell state as allowed by the forget gate;

computing an output gate mask $o_m^l$ using the input video data $x_m^l$, the latent representation at the previous time step $h_{m-1}^l$, and an updated cell state $c_m^{l}$; and calculating a new latent representation $h_m^l$ for the input video data $x_m^l$ using the cell state passed through the output gate.

17. The non-transitory computer readable medium as claimed in claim 14, wherein the attention network extracts the micro-scale information by:

performing attention pooling of hidden states, comprising:

computing a context $\hat{C}$ of the input video data $x_m^l$ by using micro spatio-temporal features extracted from the input video data $x_m^l$;

computing an attention gate mask $sh_{j+k}^{l-1}$ using the context $\hat{C}$ at each time step and a latent hidden representation computed from the first layer LSTM;

extracting a plurality of hidden state representations within the context $\hat{C}$ by using an attention gate mask at every time step; and combining a plurality of the hidden state representations within each one second duration to generate a pooled hidden state representation ph; and performing attention pooling of cell states, comprising:

computing the context $\hat{C}$ of the input video data $x_m^l$ by using the micro spatio-temporal features extracted from the input video data $x_m^l$;

compute the attention gate mask $sc_{j+k}^{l-1}$ at every time step using the context $\hat{C}$ and the latent hidden representation computed from the first layer LSTM;

extracting cell state representations within the context $\hat{C}$ by using the attention gate mask at every time step; and combining a plurality of the cell state representations within one second duration to generate a pooled cell state representation pc.

18. The non-transitory computer readable medium as claimed in claim 14, wherein extracting the spatio-temporal information corresponding to the collected video, using the micro-scale information from the attention network, comprises:

computing an input gate mask $i_m^l$ by using a pooled hidden representation from previous layers $ph_m^l$, the latent representation from a previous time step $h_{m-1}^l$, and cell state of the previous time step $c_{m-1}^l$;

computing a forget gate mask $f_m^l$ by using the pooled hidden representation from previous layers $ph_m^l$, the latent feature representation from previous time step $h_m^l$, and the cell state of previous time step $c_{m-1}^l$;

computing a cell state at current time step by forwarding the pooled hidden state representation and representation from previous time step through the input gate combined with the pooled cell state as allowed by the forget gate;

computing the output gate mask $o_m^l$ using the pooled hidden representation, latent representation at previous time step, and an updated cell state; and computing a new latent representation $h_m^l$ for the given input video using the cell state passed through the output gate.

19. The non-transitory computer readable medium as claimed in claim 14, wherein training the neural network using the spatio-temporal information extracted from the collected video comprises:

dividing the spatio-temporal information into spatial information defined at a frame level;

dividing the spatio-temporal information into micro-temporal information comprising motion information spanning less than a second and macro-temporal information comprising information more than a second; and generating a data model using the spatial information captured from the spatial information defined at the frame level, the micro-temporal information, and the macro-temporal information.

\* \* \* \* \*